United States Patent

Carroll

[11] Patent Number: 4,869,328
[45] Date of Patent: Sep. 26, 1989

[54] CHISEL PLOW POINT

[76] Inventor: John M. Carroll, 1120 Wayne St., Sandusky, Ohio 44870

[21] Appl. No.: 74,144

[22] Filed: Jul. 16, 1987

[51] Int. Cl.[4] .................... A01B 23/02; A01B 15/08
[52] U.S. Cl. .................... 172/719; 172/747; 172/771; 172/769
[58] Field of Search ............... 172/719, 754, 752, 747, 172/769, 762, 722, 771, 772

[56] References Cited

U.S. PATENT DOCUMENTS

| | | |
|---|---|---|
| 27,349 | 7/1897 | Wiard . |
| 28,329 | 3/1898 | Ream . |
| 52,539 | 2/1866 | Cottman . |
| 55,279 | 6/1866 | Gilson et al. . |
| 65,412 | 6/1867 | Mendenhall . |
| 68,635 | 9/1867 | March . |
| 71,735 | 12/1867 | Gibbs et al. . |
| 93,162 | 8/1869 | Barnes . |
| 93,853 | 8/1869 | Ball, Jr. . |
| 150,087 | 4/1874 | Schenck . |
| 164,134 | 6/1875 | Bradley . |
| 600,801 | 3/1898 | Puckett . |
| 681,547 | 8/1901 | Hartig ..................... 172/771 |
| 1,002,283 | 9/1911 | Koch . |
| 1,209,868 | 12/1916 | Wiard . |
| 1,696,802 | 12/1928 | Kaufman . |
| 1,787,366 | 12/1930 | Fountain ................. 172/722 |
| 2,626,555 | 1/1953 | Frevik . |
| 2,908,339 | 10/1959 | Cook ....................... 172/754 |
| 2,908,339 | 10/1959 | Cook . |
| 3,762,483 | 10/1973 | Meiners ................. 172/769 X |
| 3,850,252 | 11/1974 | Ingalls ..................... 172/771 |
| 3,995,698 | 12/1976 | Nelson ..................... 172/719 |
| 4,119,158 | 10/1978 | Carlsson et al. .......... 172/704 |
| 4,313,503 | 2/1982 | Good ........................ 172/771 |
| 4,363,364 | 12/1982 | Wetmore ................. 172/747 |
| 4,596,606 | 6/1986 | Kovacs ..................... 148/138 |
| 4,616,580 | 10/1986 | Moore ...................... 172/699 |
| 4,737,199 | 4/1988 | Hovacs ..................... 148/138 |

OTHER PUBLICATIONS

Farm Journal's, p. 35, Jun. 1980, Kewanee Miniature Moldboard.

*Primary Examiner*—Richard J. Johnson
*Attorney, Agent, or Firm*—Watts, Hoffmann, Fisher & Heinke

[57] ABSTRACT

A chisel plow point consisting of a unitary tip section, a tip extender portion extending in the direction opposite to that of the tip section and conforming to and adapted to overlie the end section of a moldboard to present a working surface that turns and throws the soil during the plowing operation, whereby the moldboard is protected against wearing engagement with the soil, a recess behind the extender portion shaped to receive an end section of the moldboard, and an adapter for attachment of the plow point to the plow frame. The tip extender is approximately equal in length to the length of the tip section, is thinner in cross-section than the tip section and has a generally concave configuration to conform with the plow moldboard.

9 Claims, 2 Drawing Sheets

4,869,328

CHISEL PLOW POINT

TECHNICAL FIELD

This invention relates to plow parts for reducing chisel plow moldboard wear, and in particular to a new plow point adapted to be connected to the moldboard so as to reduce wear thereof.

BACKGROUND ART

In the past, chisel plow moldboards have tended to wear excessively at specific locations as a result of soil movement along the moldboard. As the soil travels along the moldboard it is first lifted by the plow and turned upon engagement with contoured portions of the moldboard to "throw" the soil. Excessive wear occurs at the contoured portions of the moldboard where the turning soil has a scouring effect on the metal. Moldboard wear additionally results from use of the plow in particularly abrasive or hard soil which has an even more severe scouring effect. Frequent replacement of moldboards used under these conditions is required to continue proper operation of the plow and prevent damage to adjacent plow parts.

DISCLOSURE OF THE INVENTION

The present invention provides a novel and improved chisel point for reducing plow moldboard wear. The device is cast from a wear-resistant metal, preferably, austempered ductile iron, to extend the useful life of both the chisel point and the adjacent moldboard. The new chisel point is designed to extend and cover locations of the moldboard which are known to be subjected to excessive soil wear.

Use of ductile iron for the chisel point of the present invention extends the life of the chisel point and moldboard by at least a factor of two, and can increase the lifespan of the device by as much as a factor of three or four, as compared to conventional chisel plow tips and moldboards. Conventional steel forged plow tips typically have a useful life of 150 acres, while wear tips of the present invention can work over 400 acres before requiring replacement.

Extending the lives of both the wear piece and associated moldboard by such an increased rate provides a clear economic advantage, since chisel points and moldboards are expensive. Not only are the chisel points and moldboards expensive, but they are used in large numbers, and therefore must be replaced in large quantities. Each chisel plow, for example, may have four or more pairs of wear pieces and moldboards extending in a row from the frame, and each frame may have multiple rows. Wear pieces having reduced wear resistance and consequently reduced rates of replacement, are therefore extremely advantageous for an agricultural community whose population is in the midst of decline due to resource limitations which are becoming increasingly severe.

In the preferred embodiment of the present invention, the chisel point comprises a unitary body attached to the moldboard, the body having a tip section and a tip extender portion with its forward surface extending smoothly in a direction opposite to that of the tip section. The tip extender conforms and overlies an end section of the moldboard. A recess behind the tip extender portion is shaped to receive an end section of the moldboard. A working surface is presented on the leading face of the chisel point for turning and throwing the soil during plowing such that the moldboard is protected from soil wear.

During the plowing operation the tip section of the body first engages the soil. As the plow moves, the tip splits and loosens the soil. Continuous movement of the plow in the forward direction forces movement of the soil along the working surface of the body in a direction toward the tip extender. The path of soil movement follows the configuration of the chisel point body, which, along the tip extender portion, is cast in a concave configuration to conform with and engage the concave configuration of the moldboard.

The tip extender portion extends from the tip section for a distance approximately equal to the length of the length of the tip section to cover the wear points and provide moldboard wear resistance. The working surface presented on the concave tip extender portion thus covers and protects the moldboard during lifting and turning of the soil.

Further objects and advantages of the present invention will be had by reference to the following detailed description of the preferred embodiment and the accompanying drawings.

BEST MODE FOR CARRYING OUT THE INVENTION

Figure 1:
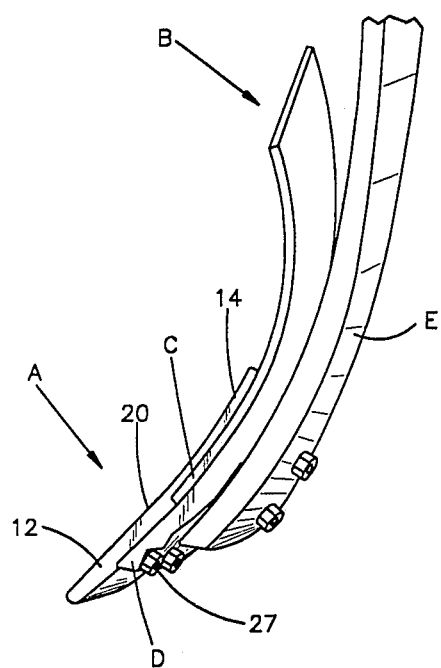
FIG. 1 is a perspective view of a chisel plow shank, adaptor, moldboard and the wear piece embodying the present invention.
Figure 2:
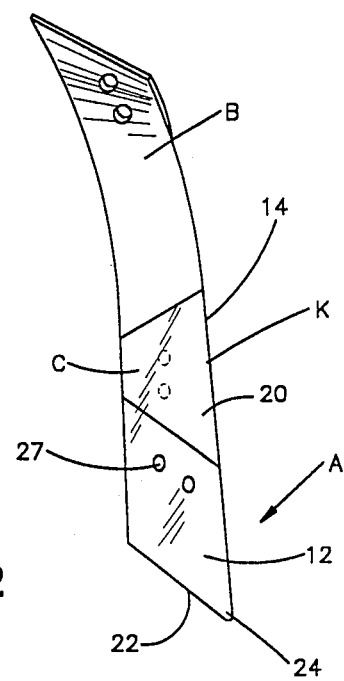
FIG. 2 is a front view of a chisel plow moldboard engaged with the wear piece embodying the present invention.

Referring to FIGS. 1 to 4 of the drawings, reference character A generally designates the chisel point of the invention. As illustrated in FIG. 1, the chisel plow point A is secured to the plow shank E by an adaptor D. The plow shank E is suspended from the plow frame (not shown). The chisel plow point A is a unitary body preferably cast of austempered ductile iron having a tip section 12, a tip extender portion 14, a recess 16, a second recess 18 and apertures 26 for securing the point to the plow frame.

The tip section 12 is on the end of the plow point which first engages the soil during the plowing operation. The tip section 12 includes a leading edge 22 having an elongated end 24 which initially engages and lifts the soil. A working surface 20 extends on a front side 11 of the chisel plow point across the tip section 12 from the leading edge 22 in a direction toward the tip extender portion 14. Attachment apertures 26 are located in the tip section 12 and extend therethrough for use in securing the device to the plow by conventional fasteners 27. The plow point is thus easily removable for replacement purposes using the fasteners 27.

Figure 4:
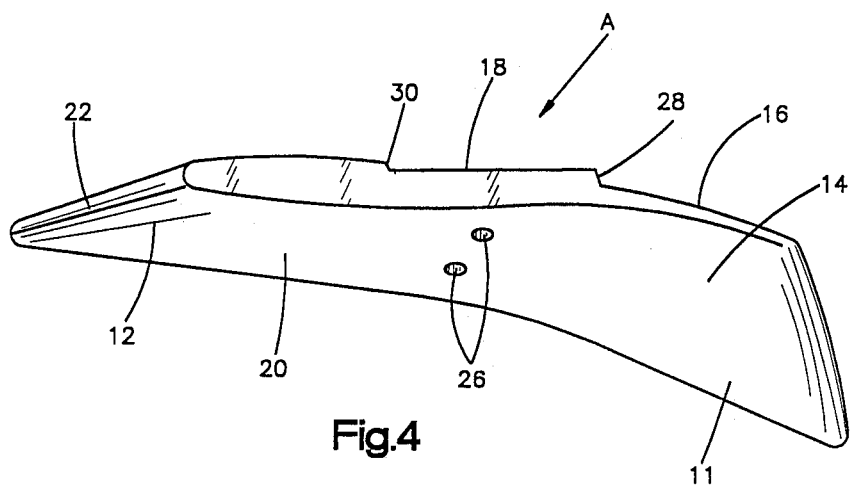
FIG. 4 is a side view of the wear piece embodying the present invention.

The tip extender portion 14 extends from the tip section 12 on an end of the chisel plow point opposite the tip section, and is adapted to conform with and overlie the end C of the moldboard B when the point A is mounted on the moldboard. An edge of the end section C of the moldboard B is illustrated in phantom in FIG. 2. The tip extender has a generally concave configuration, as shown in FIG. 4, and is substantially thinner in cross-section than the tip section.

The recess 16, located behind the tip extender portion 14 on a side of the plow point opposite the working surface 20, is shaped to receive the end section C of the moldboard. A moldboard abutment surface 28 abuts and engages the end C of the moldboard B to position and inhibit sliding movement of the point A with respect to the moldboard during plow operation.

Figure 3:
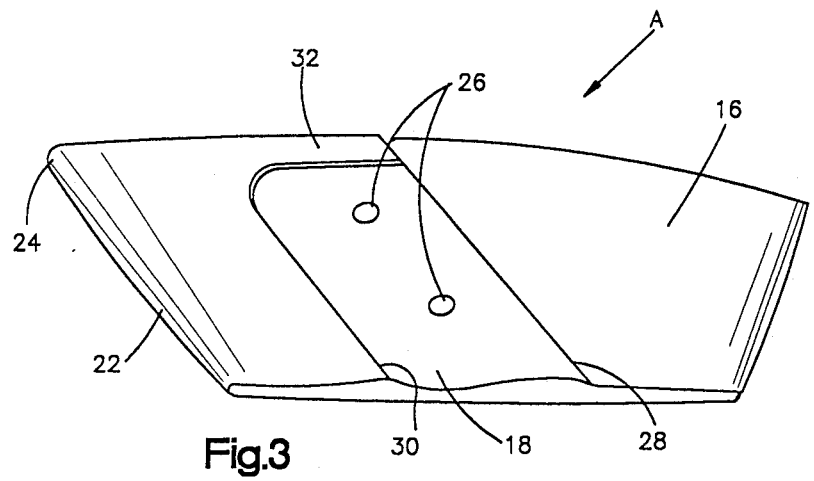
FIG. 3 is a rear view of the wear piece embodying the present invention.

The second recess 18, located behind the tip section adjacent the above recess 16 and moldboard abutment surface 28, is shaped to receive the adaptor D. An adaptor abutment surface 30 abuts and engages the adaptor D to position and inhibit sliding movement of the point A with respect to the adaptor D during plow operation. As illustrated in FIGS. 3 and 4, the adaptor abutment surface 30 defines extremities of the second recess which engages the adaptor, and a reinforced edge portion 32 extending along an edge of the tip section adjacent the adaptor abutment surface in a plane spaced from and parallel to the second recess 18.

During operation of the chisel plow, the chisel plow point A is mounted as illustrated in FIG. 1. Movement of the plow in the forward direction engages the tip section 12 with the soil such that the elongate end 24 of the leading edge 22 first cuts into the soil, followed by the remainder of the leading edge 22 until the tip section 12 is under the soil. As the plow continues to move, the tip section 12 splits and loosens the soil which is then forced along the working surface 20 toward the tip extender portion 14. The reinforced edge portion 32 of the tip section provides additional splitting and loosening of the soil, and is preferably thicker in cross section than either the first or second recesses 16, 18 to provide increased wear resistance and protection of the adaptor D during plow operation.

The path of soil movement follows the configuration of the working surface 20, such that soil reaching the concavely curved tip extender portion 14 overlapping the end of the moldboard, turns to follow the contour of working surface 20. The contoured portion of the working surface 20 which urges the soil to change direction is generally designated at reference character K. Soil movement along the contoured portion K is of an inherently abrasive nature and as a result causes excessive wear at this location. The extension of the tip extender portion 14 by an amount approximately equal in length to the tip section 14 to overlap the moldboard thus reduces wear to the moldboard by substituting the contoured working surface 20 of the tip extender portion 16 for the end section C of the moldboard B. The new and improved wear reducing plow point A thus functions not only to cut and lift the soil as prior devices have, but to additionally turn and throw the soil in the manner previously performed by the plow moldboard B.

The improved performance of the new chisel point manufactured of ductile iron was demonstrated under normal use conditions in comparative tests with conventional tips. Wear pieces of the chisel plow tip are cast of austempered ductile iron plowed over 400 acres without the need for replacement. Conventional steel forged chisel plow tips generally work only 150 acres before requiring replacement. Use of a plow tip manufactured of the preferred hardened material thus have a lifespan more than twice as long as compared with conventional plow tips. The use of the new plow tip design having the protective portion covering the moldboard should similiarly extend the life of the moldboard by at least twice the lifespan of moldboards used with conventional tips.

Many modifications and variations of the invention will be apparent to those skilled in the art from the foregoing detailed disclosure. Therefore, it is to be understood that, within the scope of the appended claims, the invention can be practiced otherwise than as specifically shown and described.

I claim:

1. In combination, a plow shank, a chisel plow point attached to the plow shank, and a moldboard detachably connected to said chisel plow point, said chisel plow point comprising a unitary tip section, a tip extender portion extending in the direction opposite to that of said tip section, said extender portion conforming to and adapted to overlie said end section of said moldboard and presenting a working surface that turns and throws the soil during the plowing operation, whereby said moldboard is protected against wearing engagement with the soil, and means for attaching said chisel plow point to said moldboard.

2. The combination as claimed in claim 1 wherein said plow point has a recess behind said extender portion that receives said end section of the moldboard.

3. The combination as claimed in claim 1 wherein the length of said extender portion is approximately equal to the length of said tip section.

4. The combination as claimed in any one of claims 1, 2 or 3 wherein said chisel point is a casting of ductile iron.

5. The combination as claimed in any one of claims 1, 2 or 3 wherein said chisel point is a casting of austempered ductile iron.

6. In combination, a chisel point adapted to be detachably connected to the end section of a moldboard comprising a unitary tip section, a tip extender portion extending in a direction opposite to that of said tip section, a first recess behind said extender portion shaped to receive an end section of said moldboard, said extender portion conforming to and adapted to overlie said end section of said moldboard and presenting a working surface that turns and throws the soil during the plowing operation, whereby said moldboard is protected against wearing engagement with the soil, a second recess adjacent said first recess, and an adapter which fits into said second recess for connecting said chisel point to a chisel plow frame.

7. The improvement as claimed in claim 6 wherein said length of said extender is approximately equal to the length of said tip section.

8. A chisel point as claimed in claim 6 wherein said working surface of said tip extender portion extends smoothly from said tip section.

9. In combination, a chisel point adapted to be detachably connected to the end section of a moldboard comprising a unitary tip section, a tip extender portion extending in a direction opposite to that of said tip section, a first recess behind said extender portion shaped to receive an end section of said moldboard, said extender portion being thinner in cross section than said tip section and having a generally concave configuration conforming to and adapted to overlie said end section of said moldboard, said extender portion presenting a working surface that turns and throws the soil during the plowing operation, whereby said moldboard is protected against wearing engagement with the soil, a second recess adjacent said first recess, and an adapter which fits into the second recess for connecting the chisel point to a chisel plow frame.

* * * * *